US008457938B2

(12) United States Patent
Archibald et al.

(10) Patent No.: US 8,457,938 B2
(45) Date of Patent: Jun. 4, 2013

(54) APPARATUS AND METHOD FOR SIMULATING ONE OR MORE OPERATIONAL CHARACTERISTICS OF AN ELECTRONICS RACK

(75) Inventors: Matthew R. Archibald, Morrisville, NC (US); Hendrik F. Hamann, Yorktown Heights, NY (US); Madhusudan K. Iyengar, Woodstock, NY (US); Roger R. Schmidt, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 11/950,735

(22) Filed: Dec. 5, 2007

(65) Prior Publication Data

US 2009/0150133 A1  Jun. 11, 2009

(51) Int. Cl.
*G06G 7/48* (2006.01)
*G06G 7/50* (2006.01)

(52) U.S. Cl.
USPC ............................................................ 703/9

(58) Field of Classification Search
USPC .................................. 703/9; 374/39; 361/701
See application file for complete search history.

(56) References Cited

U.S. PATENT DOCUMENTS

| 3,916,638 | A | * | 11/1975 | Schmidt ........................ 62/238.1 |
|---|---|---|---|---|
| 4,473,110 | A | * | 9/1984 | Zawierucha ................... 165/133 |
| 4,681,744 | A | | 7/1987 | Weitman |
| 5,002,226 | A | | 3/1991 | Nelson |
| 5,289,872 | A | * | 3/1994 | Kent .............................. 165/133 |
| 6,146,882 | A | | 11/2000 | Uematsu et al. |
| 6,775,137 | B2 | | 8/2004 | Chu et al. |
| 6,819,563 | B1 | * | 11/2004 | Chu et al. ...................... 361/696 |
| 6,868,682 | B2 | | 3/2005 | Sharma et al. |
| 7,170,745 | B2 | | 1/2007 | Bash et al. |
| 7,237,406 | B2 | * | 7/2007 | Voss et al. ...................... 62/606 |
| 7,255,474 | B2 | | 8/2007 | Cong et al. |
| 7,311,264 | B2 | | 12/2007 | Franke et al. |

(Continued)

OTHER PUBLICATIONS

Claassen et al., "Techniques for Analyzing Data Center Energy Utilization Practices", U.S. Appl. No. 11/750,325, filed May 17, 2007.

(Continued)

*Primary Examiner* — Omar Fernandez Rivas
*Assistant Examiner* — Bernard E Cothran
(74) *Attorney, Agent, or Firm* — Dennis Jung, Esq.; Kevin P. Radigan, Esq.; Heslin Rothenberg Farley & Mesiti P.C.

(57) ABSTRACT

Apparatus and method are provided for facilitating simulation of one or more operating characteristics of an electronics rack. The apparatus includes a rack frame, one or more air-moving devices associated with the rack frame, and an adjustable heat source associated with the rack frame. The one or more air-moving devices establish airflow through the rack frame from an air inlet side to an air outlet side thereof, wherein the established airflow through the rack frame is related to airflow through the electronics rack to be simulated. The adjustable heat source heats air passing through the rack frame, with heated air exhausting from the air outlet side of the rack frame simulating heated air exhausting from the electronics rack.

18 Claims, 8 Drawing Sheets

U.S. PATENT DOCUMENTS

| | | | |
|---|---|---|---|
| 7,315,448 B1 | 1/2008 | Bash et al. | |
| 7,657,347 B2 | 2/2010 | Campbell et al. | |
| 7,698,114 B2 | 4/2010 | Hamann et al. | |
| 7,726,144 B2 | 6/2010 | Larson et al. | |
| 7,739,073 B2 | 6/2010 | Hamann et al. | |
| 7,832,925 B2 | 11/2010 | Archibald et al. | |
| 7,963,119 B2 | 6/2011 | Campbell et al. | |
| 7,979,250 B2 | 7/2011 | Archibald et al. | |
| 8,184,436 B2 | 5/2012 | Campbell et al. | |
| 8,197,124 B2 | 6/2012 | Claassen et al. | |
| 8,297,069 B2 | 10/2012 | Novotny et al. | |
| 8,305,757 B2 | 11/2012 | Keisling et al. | |
| 8,327,656 B2 | 12/2012 | Tutunoglu et al. | |
| 2003/0067745 A1 | 4/2003 | Patel et al. | |
| 2004/0218355 A1* | 11/2004 | Bash et al. | 361/690 |
| 2005/0122685 A1* | 6/2005 | Chu et al. | 361/699 |
| 2005/0236145 A1 | 10/2005 | Arai et al. | |
| 2006/0036417 A1* | 2/2006 | Wu et al. | 703/9 |
| 2006/0121421 A1* | 6/2006 | Spitaels et al. | 434/118 |
| 2006/0232945 A1* | 10/2006 | Chu et al. | 361/724 |
| 2006/0265609 A1 | 11/2006 | Fung | |
| 2007/0032979 A1 | 2/2007 | Hamann et al. | |
| 2007/0291817 A1 | 12/2007 | Bradicich et al. | |
| 2008/0154534 A1 | 6/2008 | Bash et al. | |
| 2008/0209931 A1 | 9/2008 | Stevens | |
| 2008/0281551 A1 | 11/2008 | Hamann et al. | |
| 2008/0300818 A1 | 12/2008 | Brey et al. | |
| 2009/0112522 A1 | 4/2009 | Rasmussen | |
| 2009/0150123 A1 | 6/2009 | Archibald et al. | |
| 2009/0207880 A1 | 8/2009 | Ahladas et al. | |
| 2010/0107658 A1 | 5/2010 | Cockrell | |
| 2011/0010151 A1 | 1/2011 | Archibald et al. | |
| 2011/0057803 A1 | 3/2011 | Yamaoka et al. | |
| 2011/0265983 A1 | 11/2011 | Pedersen | |

OTHER PUBLICATIONS

Schmidt et al., "Best Practices for Data Center Thermal Management—Review of Literature", ASHRAE Transactions, vol. 113, Part 1, pp. 1-13, DA-07-022 (2006).

Schmidt et al., "Thermal Profile of a High-Density Data Center: Hot Spot Heat Fluxes of 512 W/ft2", ASHRAE Transactions, vol. 111, Part 2, pp. 1-13, DE-05-11-6 (2005).

Roger R. Schmidt, "Thermal Profile of a High-Density Data Center—Methodology to Thermally Characterize a Data Center", ASHRAE Transactions: Symposia, NA-04-4-2 (2004).

Schmidt et al., "Thermal Profile of World's 3rd Fastest Supercomputer—IBM's ASC Purple Cluster", ASHRAE Summer Annual Meeting (Jun. 21-25, 2006).

"High Performance Data Centers: A Design Guidelines Sourcebook", Pacific Gas & Electric (PG&E) White Paper, Pacific Gas & Electric Company, Berkeley National Laboratory for PG&E (2006).

Notice of Allowance issued for U.S. Appl. No. 11/950,758 (U.S. Letters Patent No. 7,832,925 B2), dated Jul. 9, 2010.

Office Action issued for U.S. Appl. No. 11/950,747 (U.S. Patent Publication No. 2009/0150123 A1), dated Sep. 30, 2010.

Archibald et al., "Fluid Distribution Apparatus and Method Facilitating Cooling of Electronics Rack(s) and Simulating Heated Airflow Exhaust of Electronics Rack(s)", U.S. Appl. No. 12/887,551, filed Sep. 22, 2010.

Sharma et al., "Balance of Power: Dynamic Thermal Management for Internet Data Center", Internet Systems and Storage Laboratory, HP Laboratories, Palo Alto, California (Feb. 18, 2003).

Archibald et al., Office Action for U.S. Appl. No. 12/887,551, filed Sep. 22, 2010 (U.S. Patent Publication No. 2011/0010151 A1), dated Jul. 31, 2012.

Archibald et al., Notice of Allowance for U.S. Appl. No. 12/887,551, filed Sep. 22, 2010 (U.S. Patent Publication No. 2011/0010151 A1), dated Jan. 9, 2013.

* cited by examiner

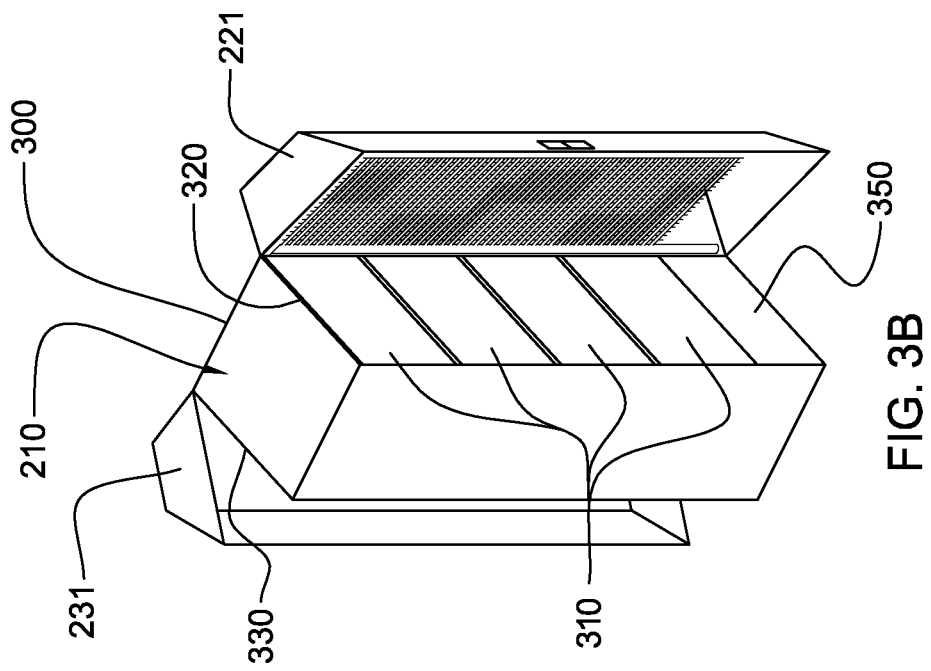
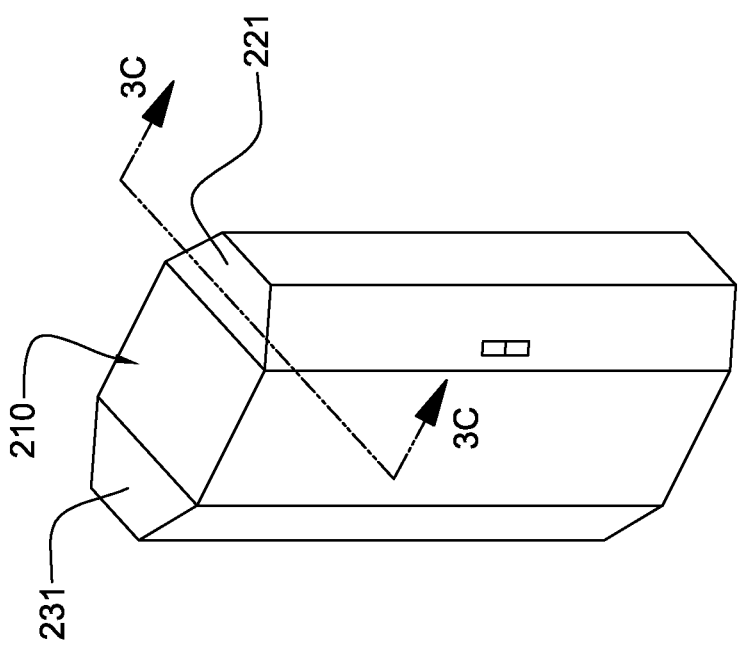
FIG. 3B
FIG. 3A

APPARATUS AND METHOD FOR SIMULATING ONE OR MORE OPERATIONAL CHARACTERISTICS OF AN ELECTRONICS RACK

TECHNICAL FIELD

The present invention relates in general to methods and apparatuses for facilitating design and optimization of a data center, and more particularly, to methods and apparatuses for thermally simulating one or more rack-mounted assemblages of individual electronics units, such as rack-mounted computer server units within a data center.

BACKGROUND OF THE INVENTION

The power dissipation of integrated circuit chips, and the modules containing the chips, continues to increase in order to achieve increases in processor performance. This trend poses a cooling challenge at both the module and system level. Increased air flow rates are needed to effectively cool high power modules and to limit the temperature of the air that is exhausted into the computer center.

In many large server applications, processors along with their associated electronics (e.g., memory, disk drives, power, etc.) are packaged in removable drawer configurations stacked within a rack or frame. In other cases, the electronics may be in fixed locations within the rack or frame. Typically, the components are cooled by air moving in parallel air flow paths, usually front-to-back, impelled by one or more air moving devices (e.g., fans or blowers). In some cases it may be possible to handle increased power dissipation within a single drawer by providing greater air flow, through the use of a more powerful air moving device or by increasing the rotational speed (i.e., RPMs) of an existing air moving device. However, this approach is becoming problematic at the rack level in the context of a computer installation (e.g., data center).

The sensible heat load carried by the air exiting the rack is stressing the ability of the room air conditioning to effectively handle the load. This is especially true for large installations with "server farms" or large banks of computer racks close together. In such installations not only will the room air conditioning be challenged, but the situation may also result in re-circulation problems with some fraction of the "hot" air exiting one rack unit being drawn into the air inlet of the same rack or a nearby rack. This re-circulating flow is often extremely complex in nature, and can lead to significantly higher rack inlet temperatures than expected. This increase in cooling air temperature may result in components exceeding their allowable operating temperature or in a reduction in long term reliability of the components.

Addressing thermal imbalances within a data center is often an expensive and time consuming operation. Therefore, there remains a need in the art for an apparatus and method which facilitate thermal and energy-based design and optimization of a data center.

SUMMARY OF THE INVENTION

The shortcomings of the prior art are overcome and additional advantages are provided through the provision of an apparatus for simulating at least one operational characteristic of an electronics rack. The apparatus comprises a rack frame, at least one air-moving device associated with the rack frame, and an adjustable heat source associated with the rack frame. The at least one air-moving device establishes airflow through the rack frame from an air inlet side to an air outlet side thereof, and wherein when established, airflow through the rack frame is related to airflow through the electronics rack to be simulated. The adjustable heat source, when operational, heats air passing through the rack frame, with heated air exhausting from the air outlet side of the rack frame simulating heated air exhausting from the electronics rack.

In a further aspect, a method of providing an apparatus to simulate at least one operational characteristic of an electronics rack is provided. The method includes: obtaining a rack frame sized to the electronics rack to be simulated; associating at least one air-moving device with the rack frame to establish airflow through the rack frame from an air inlet side to an air outlet side thereof, wherein the established airflow through the rack frame is related to airflow through the electronics rack to be simulated; and providing an adjustable heat source associated with the rack frame, which when operational, heats air passing through the rack frame, with heated air exhausting from the air outlet side of the rack frame simulating heated air exhausting from the electronics rack.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3A depicts one embodiment of one rack simulator of the plurality of rack simulators of FIG. 2, in accordance with an aspect of the present invention;

FIG. 3B depicts the rack simulator of FIG. 3A, with the inlet and outlet doors thereof pivoted open, in accordance with an aspect of the present invention;

DETAILED DESCRIPTION OF THE INVENTION

As used herein, the terms "electronics rack", "rack-mounted electronic equipment", and "rack unit" are used interchangeably, and unless otherwise specified include any housing, frame, rack, compartment, blade server system, etc., having one or more heat generating components of a computer system or electronics system, and may be, for example, a stand alone computer processor having high, mid or low end processing capability. An electronics rack comprises at least one electronics subsystem. "Electronics subsystem" refers to any sub-housing, blade, book, drawer, node, compartment, etc., having one or more heat generating electronic components disposed therein. Each electronics subsystem of an electronics rack may be movable or fixed relative to the electronics rack, with the electronics drawers of a multi-drawer rack unit and blades of a blade center system being two examples of electronics subsystems of an electronics rack to be cooled. As used herein, a "rack simulator" lacks the at least one electronics subsystem of the electronics rack to be simulated.

In addition, "data center" refers to a computer installation to contain one or more electronics racks to be cooled. As a specific example, a data center may be designed to contain one or more rows of rack-mounted computing units, such as server units. Further, as used, herein, "fluid-to-air heat exchanger" means any heat exchange mechanism characterized as described herein through which hot fluid can circulate; and includes, one or more discrete fluid-to-air heat exchangers coupled either in-series or in parallel. A fluid-to-air heat exchanger may comprise, for example, one or more fluid flow paths, formed of thermally conductive tubing (such as copper or other tubing) in thermal communication with (in one example) a plurality of thermally conductive fins. Size, configuration and construction of the fluid-to-air heat exchanger can vary without departing from the scope of the invention disclosed herein.

One example of the "hot" fluid discussed below is water. However, the concepts disclosed herein are readily adapted to use with other types of fluid. For example, a dielectric liquid, a fluorocarbon liquid, a fluoroinert liquid, a liquid metal, a brine, steam, flue gas, combustion-related gas, or other similar fluid may be employed, while still maintaining the advantages and unique features of the present invention.

Reference is made below to the drawings, which are not drawn to scale for reasons of understanding, wherein the same reference numbers used throughout different figures designate the same or similar components.

Figure 1:
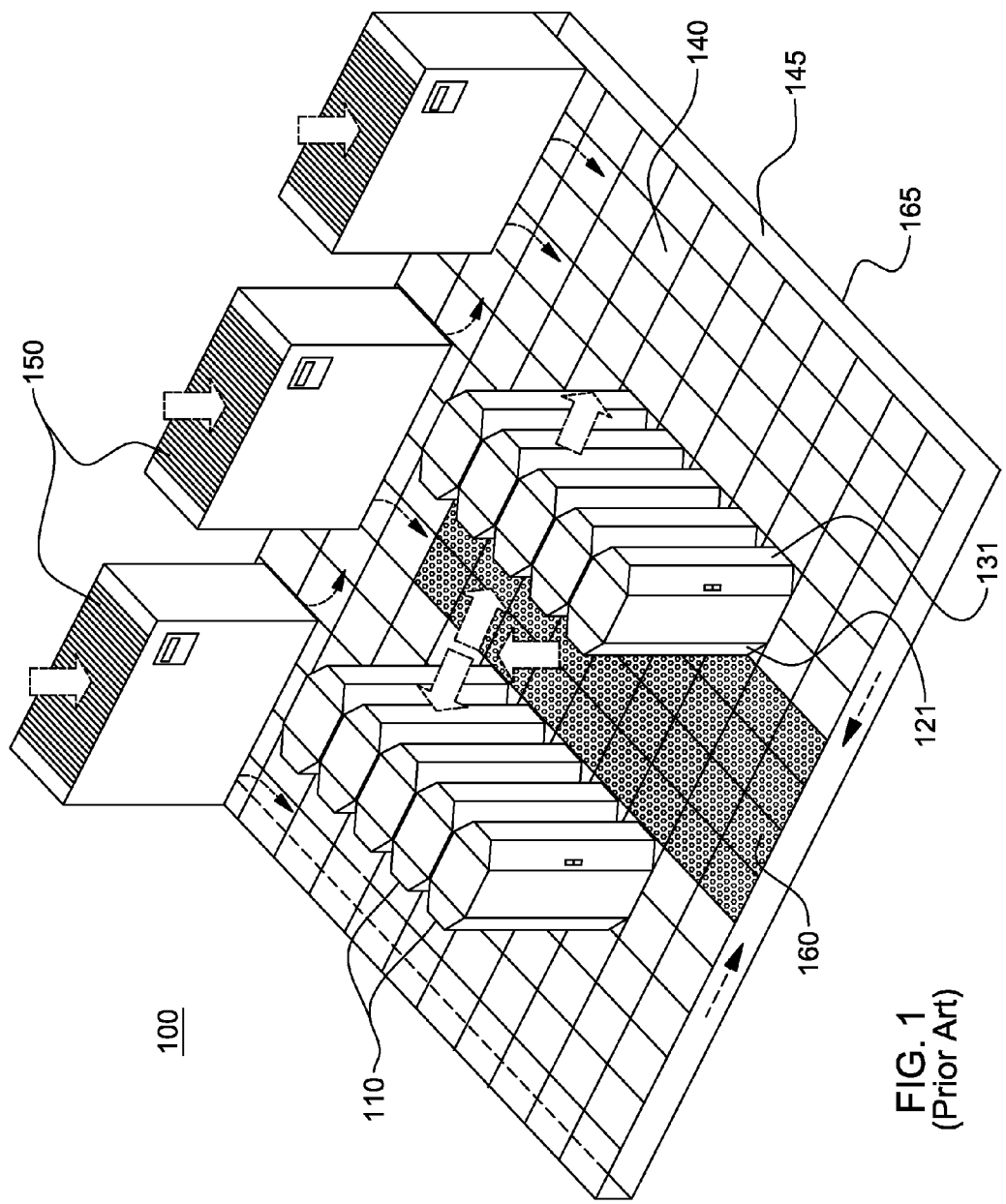
FIG. 1 depicts one embodiment of a conventional raised floor layout of an air-cooled data center.

As shown in FIG. 1, in a raised floor layout of an air cooled computer installation or data center 100 typical in the prior art, multiple electronics racks 110 are disposed in one or more rows. A computer installation such as depicted in FIG. 1 may house several hundred, or even several thousand microprocessors. In the arrangement of FIG. 1, chilled air enters the computer room via floor vents from a supply air plenum 145 defined between the raised floor 140 and a base or sub-floor 165 of the room. Cooled air is taken in through louvered air inlet doors 121 of the electronics racks and expelled through louvered air outlet doors 131 of the electronics racks. Each electronics rack 110 may have an air moving device (e.g., fan or blower) to provide forced inlet-to-outlet air flow to cool the electronic components within the electronics subsystem(s) of the rack. The supply air plenum 145 provides conditioned and cooled air to the air-inlet sides of the electronics racks via perforated floor tiles 160 disposed in a "cold" air aisle of the data center. The conditioned and cooled air is supplied to plenum 145 by one or more conditioned air units 150, also disposed within data center 100. Room air is taken into each conditioned air unit 150 near an upper portion thereof. This room air comprises in part exhausted air from the "hot" air aisles of the data center disposed adjacent to air outlet sides of the electronics racks 110.

Limiting factors for cooling an air-cooled data center, such as data center 100 in FIG. 1, are related to the maximum chilled airflow rate that can be supplied from a single perforated tile, the maximum cooling capability of the air-conditioning units within the data center, and the hot air recirculation phenomenon that is common in such data centers. Hot air recirculation occurs when the total flow rate of supplied chilled air in front of an electronics rack is less than the total airflow rate through the electronics rack, leading to the hot exhaust from one electronics rack being drawn into the intake of the same or another electronics rack, thus resulting in potentially unacceptably high air inlet temperatures. This can impact the reliability and performance of the electronics within the rack, and lead to device failure in extreme cases.

Typically, data center thermal issues are addressed using one of two approaches. Either a human expert and some degree of trial and error are employed to make changes in the data center by changing layout of, for example, perforated tiles, electronics racks, air-conditioning units, and room geometry (ceiling, walls, partitions, ducts, types of tiles), or by changing the operating point of the air-conditioning units (air or liquid flow rates, set point temperatures). Alternatively, a computer-based technique to model the data center may be employed to simulate several "what if?" scenarios, followed by a plan for making actual changes in the data center layout to improve cooling of the electronics racks.

There are two dominant problems with computer-based modeling techniques. The first is the difficulty in obtaining accurate model input information. While it is difficult to obtain accurate model input information of server racks, it is even more difficult to obtain accurate input information before installation. Such input can include the detailed physical description of the above and under-floor parts of a data center, rack power and rack flow information, tile airflow rates, and tile air temperature (which can vary), to name a few. Computer-based models also require a number of assumptions. For example, computer-based models usually assume that there is no draft or air blowing across the room from various poorly sealed boundaries of the room, and they assume that there is no escape route for air in the under-floor plenum perimeter where some cold air could, in reality, "disappear". Also, electronics racks are typically represented as perfectly rectangular units with uniform airflow and uniform heat dissipation profiles, which is often not the case.

Another problem with computer-based modeling techniques is the inherent inaccuracies arising from physics-based assumptions that are made to construct the model. These assumptions are embedded in the solver engine of the modeling tool. One example might be the use of a certain turbulence model to characterize the flow physics which would bring with it several assumptions. While such a turbulence model might be applied globally, it might only work well for certain spatial areas of the data center. Another example could be the assumption that natural convection (or buoyancy-driven flow) contributes very little to the temperature gradients in the room. Yet another assumption could be the use of fluid properties which do not vary with temperature. Such assumptions can contribute to differences between model results in air temperatures versus actual measurement data, even when the model inputs are very accurate and detailed.

Therefore, actual installation and a certain degree of trial and error are conventionally believed necessary to attain an optimized data center layout. After installation, however, it is often difficult and costly to change one or more design parameters of the data center, such as the position and number of air-conditioning units, or the layout of the electronics racks. Thus, presented herein are apparatuses and methods which address this problem of trial and error installation optimization.

Figure 2:
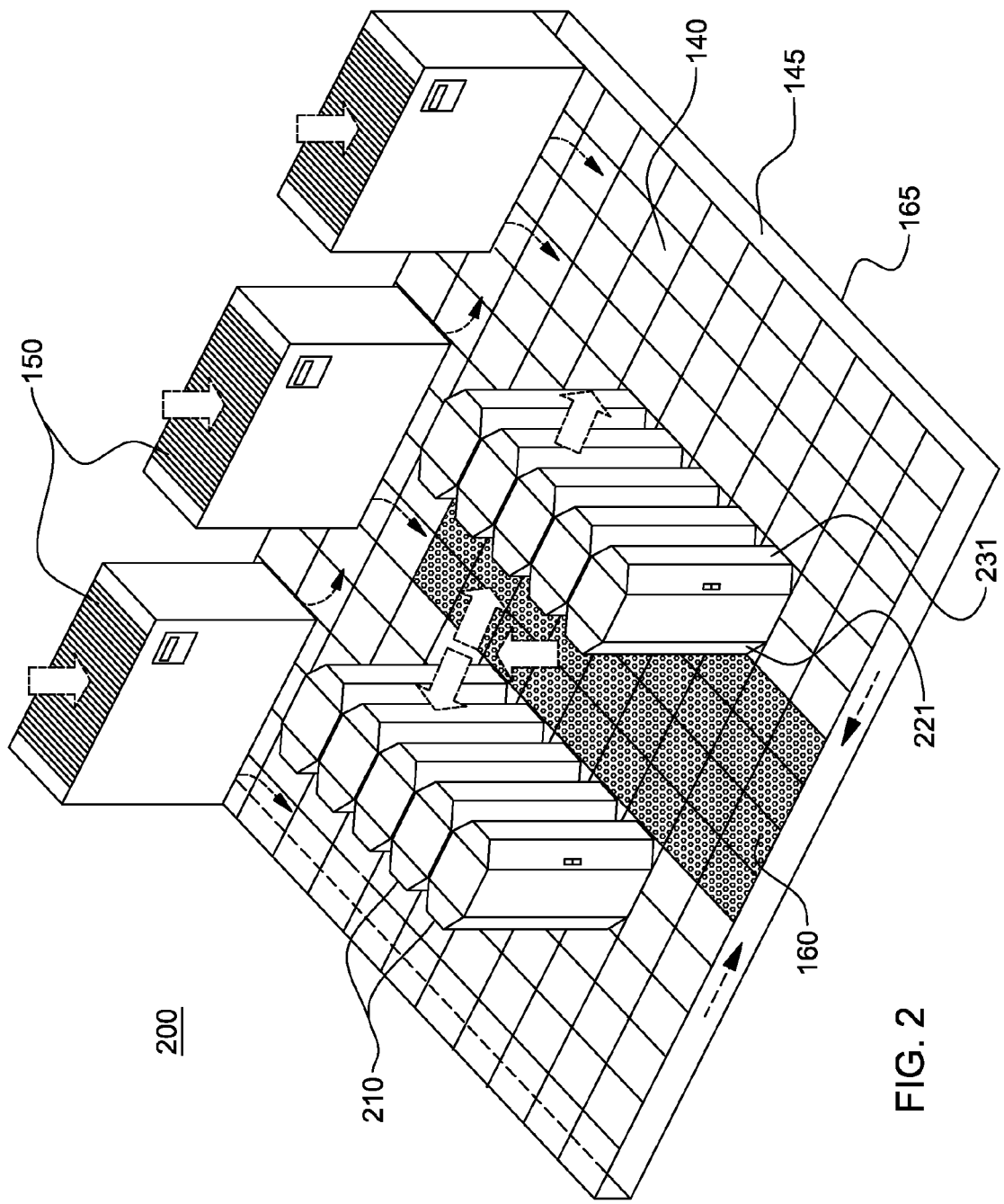
FIG. 2 depicts one embodiment of a data center layout including a plurality of apparatuses or rack simulators, in accordance with an aspect of the present invention.

FIG. 2 illustrates one embodiment of a data center layout, generally denoted 200, containing a plurality of apparatuses or rack simulators 210, in accordance with an aspect of the present invention. In one simulation implementation, a one to one correlation is employed between the number and location of rack simulators in data center layout 200 and the number and location of electronics racks 110 in data center layout 100 of FIG. 1. As explained further herein, each rack simulator 210 is constructed to simulate at least one operational characteristic of a respective electronics rack to be simulated. In one embodiment, the at least one operational characteristic includes the rate of airflow exhausting from the respective electronics rack, as well as the thermal characteristic of the airflow.

In data center 200, chilled air enters the computer room via floor vents 160 from supply air plenum 145 defined between raised floor 140 and base or sub-floor 165 of the room. Cooled air is taken in through openings in air inlet doors 221 of rack simulators 210 and expelled through air outlet doors 231 thereof. Conditioned and cooled air is supplied to plenum 145 by one or more air-conditioning units 150, also disposed within the data center. Room air is taken into each air-conditioning unit 150 near an upper portion thereof. This room air comprises in part exhausted air from the "hot" air aisles of the data center at the air outlet sides of rack simulators 210.

As explained further below, each rack simulator includes an air-moving device (e.g., fan or blower) to provide forced inlet-to-outlet airflow to simulate air cooling of the one or more electronics subsystems of the respective electronics rack being simulated. However, as noted above, rack simulators 210 lack the electronics subsystem(s) of the respective electronics rack being simulated.

FIG. 3A depicts a single rack simulator 210, which includes inlet door 221 and outlet door 231. As shown in FIG. 3B, inlet door 221 hingedly connects along one edge to a rack frame 300 of rack simulator 210 at an air inlet side 320 thereof, and outlet door 231 hingedly connects along one edge to rack frame 300 at an air outlet side 330 thereof. In one embodiment, rack frame 300 is identically configured and sized to the rack frame of the respective electronics rack to be simulated. As shown, rack simulator 210 comprises a plurality of airflow impedance structures 310, which simulate airflow impedances through a corresponding plurality of electronic subsystems of the respective electronics rack to be simulated. In one embodiment, each structure 310 simulates airflow impedance through a corresponding computer blade center system disposed within the respective electronics rack to be simulated. Rack simulator 210 further includes a modular fluid heater 350 is disposed in a lower portion thereof. This modular fluid heater 350 is described hereinbelow.

Figure 3C:
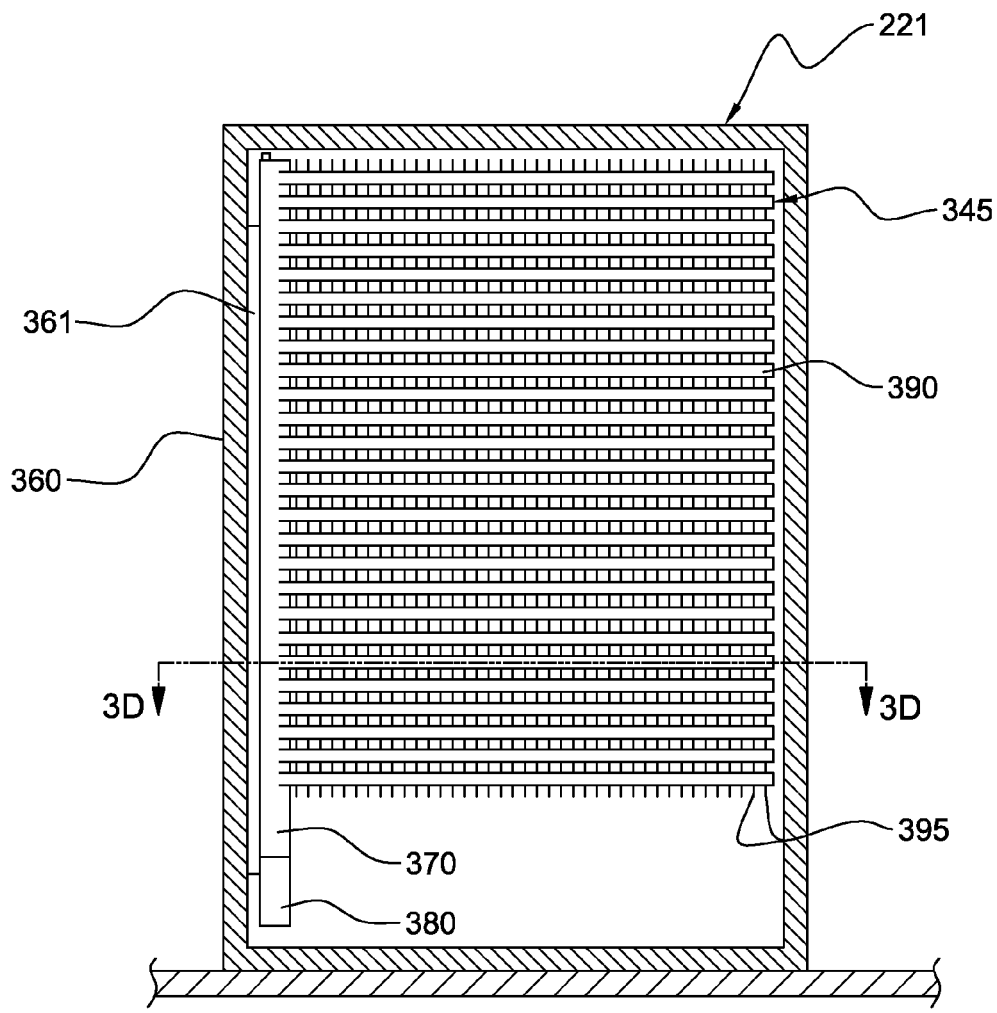
FIG. 3C is a cross-sectional elevational view of the rack simulator of FIG. 3A, taken along line 3C-3C, and illustrating a fluid-to-air heat exchanger disposed within the front door thereof, in accordance with an aspect of the present invention.
Figure 3D:
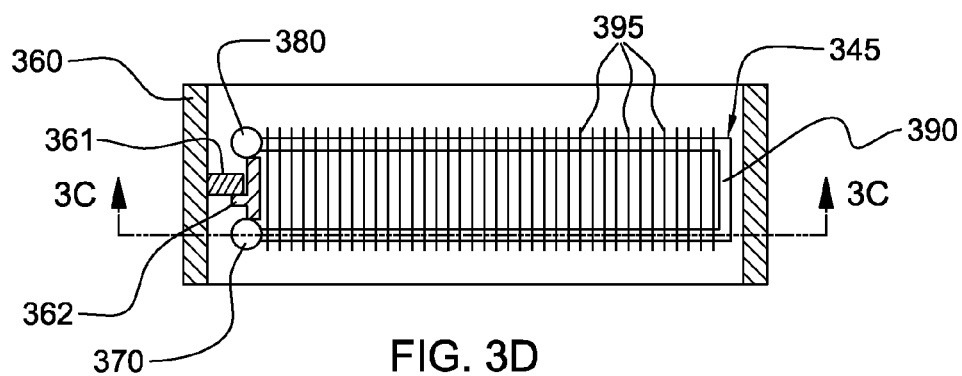
FIG. 3D is a cross-sectional plan view of the structure of FIG. 3C, taken along line 3D-3D, in accordance with an aspect of the present invention.

FIG. 3C is a cross-sectional elevational view through inlet door 221 and fluid-to-air heat exchanger 345 supported thereby, while FIG. 3D is a cross-sectional plan view of inlet door 221 illustrating fluid inlet and outlet plenums 370, 380, respectively, of the fluid-to-air heat exchanger. Referring to both figures collectively, inlet door 221 includes an inlet door frame 360 which supports a rigid flap 361, attached (for example) by welding, brazing or soldering, to a plate 362 secured between fluid inlet plenum 370 and fluid outlet plenum 380. In one embodiment, fluid inlet plenum 370 receives (via appropriate piping) hot fluid from, for example, modular fluid heater 350 (see FIG. 3B), and fluid outlet plenum 380 exhausts (via appropriate piping) lukewarm fluid to modular fluid heater 350. Fluid-to-air heat exchanger 345 includes a plurality of horizontally-oriented heat exchange tube sections 390. These heat exchange tube sections 390 each comprise a fluid channel having an inlet and outlet, with each fluid channel inlet being coupled to fluid inlet plenum 370, and each fluid channel outlet being coupled to fluid outlet plenum 380. A plurality of fins 395, which in one embodiment are vertically-oriented, rectangular fins, are attached to the horizontally-oriented heat exchange tube sections 390 to facilitate transfer of heat from hot fluid passing through the fluid channels to air flowing across the fluid-to-air heat exchanger, thereby causing heated air to be exhausted from the heat exchanger, and hence from rack simulator 210 (see FIGS. 3A & 3B). Rack simulator 210 (FIGS. 3A & 3B) is tailored so that the heated air exhausting therefrom simulates (i.e., is directly related to the amount and temperature of) hot air exhausting from the respective electronics rack being simulated. For example, laboratory testing of the respective electronics rack when operational can be performed to obtain operational flow rate and temperature data on the heated air exhausting from the electronics rack, which is then used to tailor the rack simulator to simulate the operating electronics rack.

Figure 4:
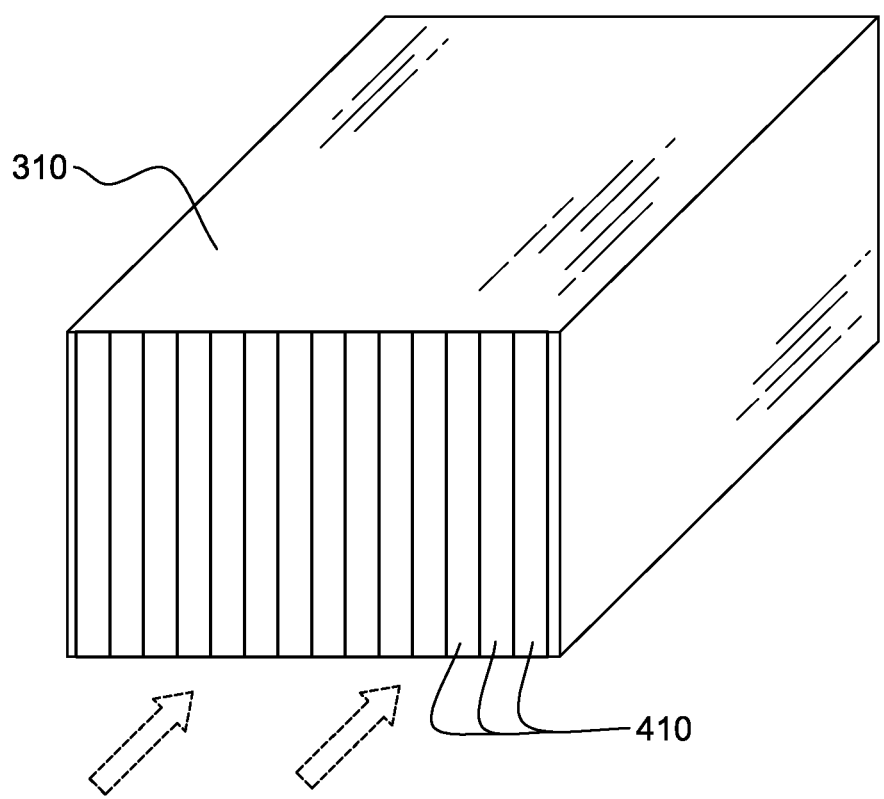
FIG. 4 is an isometric view of one embodiment of a blade center chassis containing a plurality of dummy-blade airflow impedance filters to simulate airflow impedance through a computer blade center system comprising a blade center chassis and a plurality of server blades, in accordance with an aspect of the present invention.

As noted above in connection with FIG. 3B, in one embodiment, rack simulator 210 comprises a plurality of blade center chassis 310 stacked within rack frame 300. FIG. 4 illustrates one embodiment of a blade center chassis 310, wherein a plurality of slots are conventionally provided for receiving a plurality of server blades (not shown) of a computer blade center system. In order to simulate a similar airflow impedance through a corresponding computer blade center system (containing a plurality of blade servers), a plurality of dummy-blade airflow impedance filters 410 are disposed within the slots of blade center chassis 310. These dummy-blade airflow impedance filters 410 are designed to attain an airflow impedance similar to the impedance through the corresponding computer blade center system of the electronics rack being simulated. Alternatively, fluid-to-air heat exchanger 345 (FIGS. 3C-3D) could be configured so that airflow impedance through the heat exchanger mirrors airflow impedance through the corresponding electronics rack being simulated, including through one or more computer blade center systems thereof.

Figure 5A:
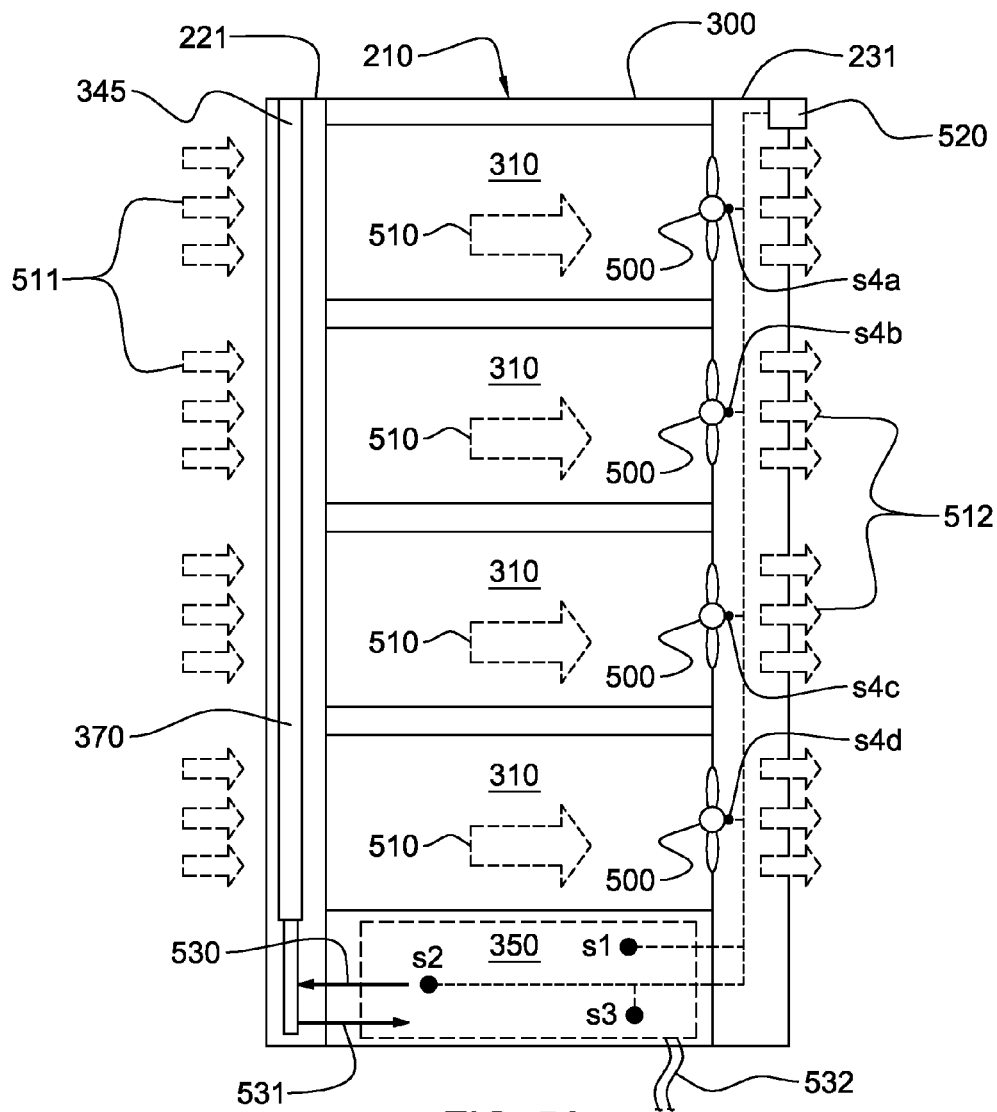
FIG. 5A is a cross-sectional elevational view of one embodiment of a rack simulator, in accordance with an aspect of the present invention.
Figure 5B:
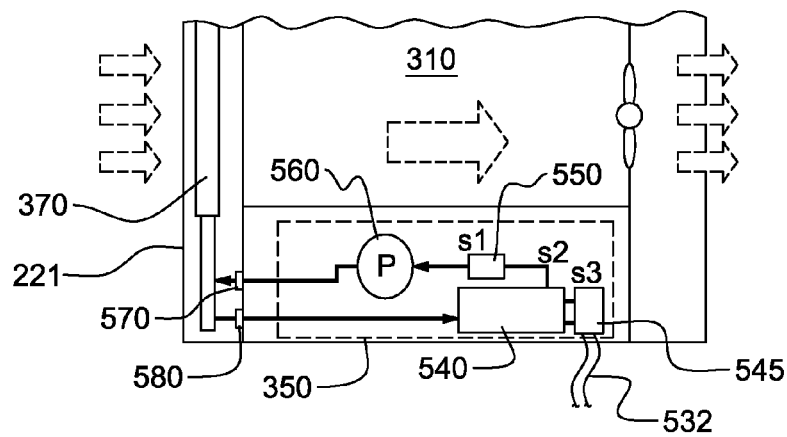
FIG. 5B is a detailed, partial view of the rack simulator of FIG. 5A, illustrating one embodiment of a modular fluid heater, in accordance with an aspect of the present invention.

FIGS. 5A & 5B depict one detailed embodiment of rack simulator 210, in accordance with an aspect of the present invention. In this embodiment, rack simulator 210 includes rack frame 300, inlet door 221 and outlet door 231. Inlet door 221 is hingedly connected along one edge to rack frame 300 at the air inlet side thereof, and outlet door 231 is hingedly connected along one edge to rack frame 300 at the air outlet side thereof. A plurality of blade center chassis 310 are stacked within rack frame 300, with each blade center chassis including one or more air-moving devices 500 at a back side thereof for establishing airflow 510 through rack simulator 210. The plurality of air-moving devices 500 are coupled to a control unit 520, which is disposed (in one embodiment) in outlet door 231 of rack simulator 210. Control unit 520 includes logic for controlling air-moving devices 500, for example, by controlling RPMs of the air-moving devices, and thereby control the amount airflow through the respective blade center chassis 310. In one embodiment, airflow through each blade center chassis is separately customized by controlling the respective air-moving device(s) 500 at the back side thereof.

When operational, external air 511 enters rack simulator 210 through inlet door 221, where the air is heated by fluid-to-air heat exchanger 345, after which the heated air flows through the respective blade center chassis 310 and is exhausted out outlet door 231 as heated exhaust air 512. In one embodiment, external air 511 is heated so that the temperature of heated exhaust air 512 simulates (or corresponds) to temperature of heated air exhausting from the electronics rack to be simulated. Laboratory measurements on the operating electronics rack can be employed to attain the desired temperature value for heated exhaust air 512. Further, the airflow rate through each blade center chassis can be controlled to be commensurate with a corresponding blade center computer system with the electronics rack to be simulated. If desired, airflow rate can be further tuned to reflect a particular data center environment by manually or automatically controlling the air-moving devices (e.g., through an appropriate user interface on the control unit).

Fluid heater 350, which provides hot fluid to the fluid-to-air heat exchanger, includes three sensors s1, s2 and s3, which are coupled to control unit 520. Sensor s1 senses and facilitates control of a variable frequency drive 550 (see FIG. 5B) for a pump 560 which supplies hot fluid via respective piping and a connect coupling 570 to fluid inlet plenum 370 of the heat exchanger. Fluid is returned to fluid heater 350 from the fluid outlet plenum via a connect coupling 580 and appropriate piping for heating by an electrical fluid heater 540. Sensor s2 is a temperature sensor which allows the control unit to monitor temperature of the hot fluid being fed to the fluid-to-air heat exchanger. Sensor s3 senses the power setting of a variable power supply 545 powering electrical fluid heater 540. As also shown, sensors s4a, s4b, s4c & s4d are coupled to respective air-moving devices 500 for monitoring and controlling rotations (or RPMs) thereof, and hence airflow rate through the rack simulator.

Advantageously, rack simulator 210 employs the actual blade center chassis 310 used within the blade center computer system commercially available today. This allows the flow dynamics through rack simulator 210, and the exhausted airflow 512 from the air outlet side thereof, to closely simulate or correspond to the air passing through and exhausting from the respective electronics rack being simulated.

Control unit 520 includes (in one embodiment) logic for automatically controlling airflow rate through the blade center chassis of rack simulator 210, according to standard operating parameters for the corresponding electronics rack being simulated. For example, installation elevation may be considered to account for varying air density and inlet air temperature for the operating electronics rack. These parameters can be tuned to ensure that the resultant hot air exhausting from rack simulator 210 accurately mirrors hot air exhausting from the operating electronics rack being simulated.

In the depicted embodiment, temperature of hot fluid through fluid-to-air heat exchanger 345 is controlled by varying the power supplied to electrical fluid heater 540 (via variable power supply 545), as well as through control of a fluid control valve or variable frequency drive 550 to tailor the flow rate and temperature of hot fluid supplied to the fluid-to-air heat exchanger. A standard electrical connection 532 powers variable power supply 545. By using an electrical fluid heater, the amount of power consumed by the electrical heater can relate to the amount of heat generated within the rack simulator. In one example, the fluid-to-air heat exchanger is designed to facilitate exchange of about 30 kW of heat between the fluid and air streams. From a typical heat exchanger design point, and for a conventional form factor, for an 1800 CFM airflow rate, and 9 GPM of fluid flow rate, heat addition in the 30-40 kW range is readily attainable.

Figure 6:
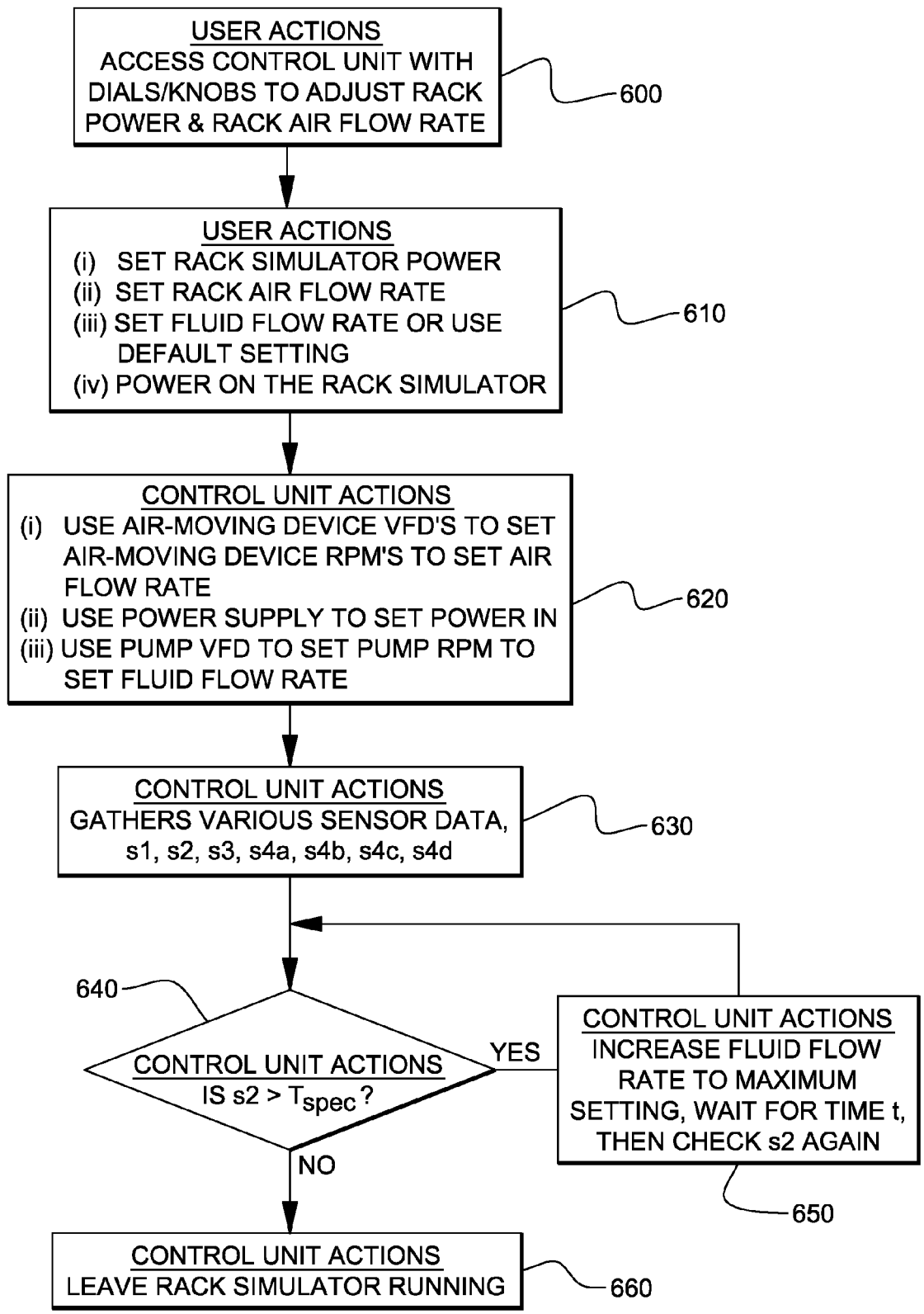
FIG. 6 is a flowchart of one processing embodiment of user and control unit actions using a rack simulator, such as depicted in FIGS. 3A-5B, in accordance with an aspect of the present invention.

FIG. 6 illustrates one embodiment of possible user and control unit actions with a rack simulator such as depicted in FIGS. 5A & 5B. The control unit provides a user interface which allows for a number of user interactions 600. These interactions include the user accessing the control unit via dials, knobs, buttons, or an alphanumeric keypad on the control unit to adjust desired rack power and rack airflow rate. Specifically, the user can employ the control unit to set rack power, rack airflow rate, fluid flow rate (or use a default setting), and to power ON the rack simulator 610. In one example, setting rack power refers to setting the amount of power supplied by the adjustable power supply to the electrical fluid heater. The rack airflow rate is set by adjusting the RPMs of the air-moving devices disposed, in the embodiment of FIGS. 5A & 5B, at the back sides of the respective blade center chassis.

The control unit actions include using variable frequency drives associated with the air-moving devices to set the RPMs of the air-moving devices, and thereby set the airflow rate(s) through the rack simulator. In addition, the control unit uses the adjustable power supply to set power to the electrical fluid heater, and the variable frequency drive of the pump to set the pump RPMs, and hence the fluid flow rate through the fluid-to-air heat exchanger 620. After setting these variables, the control unit gathers various sensor data including, data from flow control sensor s1, temperature sensor s2, power supply sensor s3 and air-moving device sensors s4a, s4b, s4c & s4d 630. The control unit monitors the rack simulator by determining whether the sensed temperature is greater than a predefined maximum temperature for hot fluid passing through the fluid-to-air heat exchanger 640. If "yes", then the control unit increases the fluid flow rate (for example) to a maximum setting, waits a time interval t, then checks the hot fluid temperature again 650. If the control unit is unable to bring the hot fluid temperature within specification, then the rack simulator is automatically shut down by the control unit. However, if the sensed hot fluid temperature is within specification, then the control unit allows the rack simulator to remain operational 660.

Figure 7:
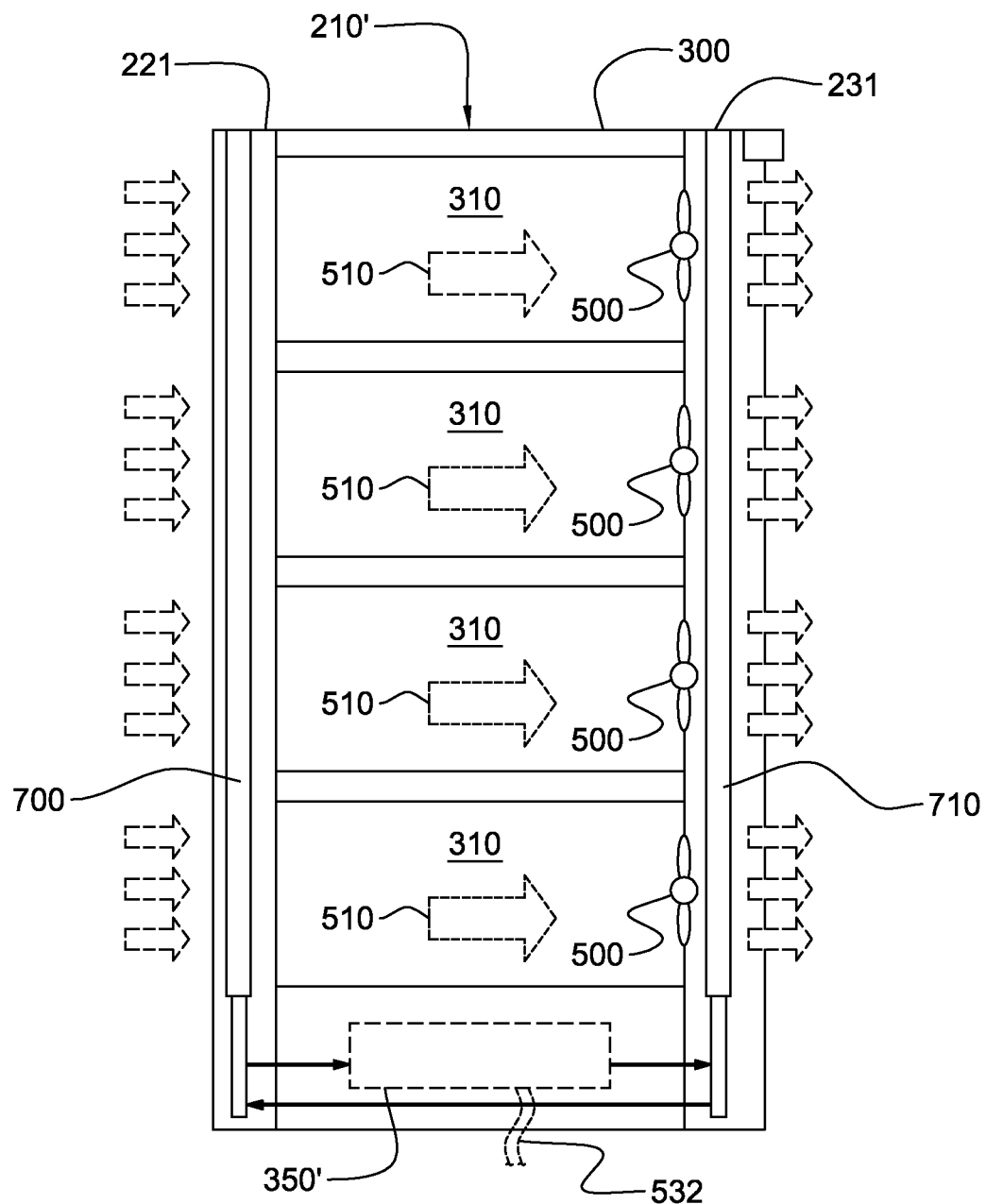
FIG. 7 is a cross-sectional elevational view of an alternate embodiment of a rack simulator, in accordance with an aspect of the present invention.

FIG. 7 depicts an alternate embodiment of a rack simulator 210', in accordance with an aspect of the present invention. In this embodiment, rack simulator 210' includes rack frame 300, inlet door 221 and outlet door 231. Inlet door 221 hingedly connects along one edge to rack frame 300 at the air inlet side thereof, and outlet door 231 hingedly connects along one edge to rack frame 300 at the air outlet side thereof. A plurality of blade center chassis 310 are stacked within rack frame 300 and include air-moving devices 500 at the back sides thereof. In one example, two air-moving devices are provided within each blade center chassis 310. When operational, air-moving devices 500 establish airflow 510 through rack simulator 210' from the air inlet side to the air outlet side thereof. In the rack simulator embodiment of FIG. 7, a first fluid-to-air heat exchanger 700 is disposed within inlet door 221, and a second fluid-to-air heat exchanger 710 is disposed within outlet door 231. A fluid heater 350' is electrically powered 532 and heats fluid circulating through the heat exchangers. In this embodiment, hot fluid is provided initially to second fluid-to-air heat exchanger 710, and then output to first fluid-to-air heat exchanger 700 (which is connected in serial communication therewith), before returning to fluid heater 350'.

In alternate configurations, the hot fluid could initially be provided to the first fluid-to-air heat exchanger, and then to the second fluid-to-air heat exchanger, or separate fluid heaters could provide hot fluid separately to the two heat exchangers. Advantageously, the rack simulator embodiment of FIG. 7 increases the heat exchange area and thus provides a higher temperature air exhaust out the air outlet side of rack simulator 210' without increasing temperature of the hot fluid.

Advantageously, those skilled in the art will note from the above description that provided herein is a rack simulator which, when operational, is designed to simulate a respective operating electronics rack comprising one or more electronics subsystems, such as multiple blade center computer systems. Additionally, by electrically driving the heat mechanism for the rack simulator, power consumed by the operating electronics rack is also simulated. In the rack simulator disclosed herein, there is a one-to-one correspondence between power consumed and thermal output of the rack simulator. The rack simulator described above can be employed to perform a real world thermal simulation at a data center to: demonstrate air-conditioning related instability of the data center; optimize layout of electronics racks within the data center with respect to cooling and energy consumption; accurately predict future air-conditioning requirements and placement; and ensure smooth installation of high density electronics racks. Additionally, the rack simulator described herein allows a manufacturer to systematically benchmark predictive tools, validate thermal/energy data collection tools, validate and generate algorithms using actual data, and test out energy reduction tools and methodologies. Further, the rack simulator described herein could be employed as a test bed for showcasing data center cooling ideas.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An apparatus for physically simulating at least one operational characteristic of an electronics rack comprising at least one electronic subsystem, the apparatus comprising:
   a rack frame distinct from the electronics rack for which at least one operational characteristic is to be physically simulated, the rack frame lacking the at least one electronic subsystem of the electronics rack;
   at least one of an air inlet door or an air outlet door, the air inlet door being hingedly mounted along one edge to the rack flame at an air inlet side thereof and comprising an opening therein allowing external air into the rack frame, and the air outlet door being hingedly mounted along one edge to the rack frame at the air outlet side thereof and comprising an opening therein allowing air from the rack frame to pass therethrough;
   at least one air-moving device associated with the rack frame to establish a physical airflow through the rack frame from an air inlet side to an air outlet side thereof, wherein established physical airflow through the rack frame correlates to anticipated airflow through the electronics rack; and
   an adjustable heat source associated with the rack frame, the adjustable heat source comprising an adjustable fluid heater providing a heated fluid of a controlled temperature, and at least one heated fluid-to-air heat exchanger coupled to receive the heated fluid, the adjustable heat source controllably heating air passing through the rack frame, wherein the at least one heated fluid-to-air heat exchanger is mounted within at least one of the at least one air inlet door or air outlet door, and heats air passing across the at least one heated fluid-to-air heat exchanger by transferring heat from the heated fluid passing therethrough to the air passing thereacross, with heated air physically exhausting from the air outlet side of the rack frame being controlled to physically simulate anticipated heated air to exhaust from the electronics rack during operation thereof.

2. The apparatus of claim 1, further comprising at least one airflow impedance filter positioned within the rack frame and configured to simulate an airflow impedance from the air inlet side of the rack frame to the air outlet side thereof correlated to anticipated air inflow impedance through the electronics rack from an air inlet side to an air outlet side thereof during operation of the electronics rack.

3. The apparatus of claim 2, wherein the adjustable heat source comprises:
   piping providing the heated fluid to the at least one heated fluid-to-air heat exchanger to heat air passing through the rack frame and exhausting from the air outlet side thereof, and thereby physically simulate anticipated heated airflow to exhaust from the electronics rack during operation thereof.

4. The apparatus of claim 3, further comprising a controller monitoring and controlling at least one of the at least one air-moving device, temperature of the heated fluid supplied to the at least one heated fluid-to-air heat exchanger, or the heated fluid flow rate to the heated fluid-to-air heat exchanger.

5. The apparatus of claim 4, wherein the controller is associated with the rack frame and dynamically adjusts at least one of RPMs of the at least one air-moving device, temperature of the heated fluid supplied to the at least one heated fluid-to-air heat exchanger or flow rate of the heated fluid supplied to the at least one heated fluid-to-air heat exchanger to facilitate different physical simulations of anticipated heated air exhausting from the electronics rack, the different physical simulations simulating anticipated heated air exhausting from the electronics rack with different electronic subsystem configurations disposed within the electronics rack.

6. The apparatus of claim 3, wherein the adjustable fluid heater comprises an electrical fluid heater, and an adjustable power supply supplying power to the electrical fluid heater, wherein adjustment of power provided to the adjustable fluid heater by the adjustable power supply controls the temperature of the heated fluid supplied to the at least one heated fluid-to-air heat exchanger.

7. The apparatus of claim 2, further comprising at least one blade center chassis disposed within the rack frame, each blade center chassis being configured to receive a plurality of electronic blades of a computer blade center system, and wherein the apparatus comprises a plurality of dummy-blade airflow impedance filters disposed within each blade center chassis of the rack frame to physically simulate operational airflow impedance through a respective computer blade center system disposed within the electronics rack, the plurality of dummy-blade airflow impedance filters being distinct from the plurality of electronic blades of the computer blade center system.

8. The apparatus of claim 7, wherein multiple blade center chassis are disposed within the rack frame, each blade center chassis comprising a respective plurality of dummy-blade airflow impedance filters to simulate airflow impedance through the respective computer blade center system of the electronics rack, and wherein the apparatus comprises multiple air-moving devices, at least one air-moving device of the multiple air-moving devices being disposed at an air outlet side of a respective blade center chassis of the multiple blade center chassis disposed within the rack frame.

9. The apparatus of claim 1, wherein the apparatus comprises both the air inlet door and the air outlet door, and wherein the adjustable heat source comprises a first heated fluid-to-air heat exchanger mounted within the air inlet door hingedly mounted to the rack frame at the air inlet side thereof, and a second heated fluid-to-air heat exchanger mounted within the air outlet door hingedly mounted to the rack frame at the air outlet side thereof, and wherein the first heated fluid-to-air heat exchanger and the second heated fluid-to-air heat exchanger are coupled via piping in-series fluid communication for transfer of the heated fluid through the first heated fluid-to-air heat exchanger and the second heated fluid-to-air heat exchanger for heating of air passing through the rack frame.

10. The apparatus of claim 1, wherein the electronics rack to have at least one operational characteristic physically simulated comprises multiple electronic subsystems, and wherein the apparatus further comprises multiple air-moving devices associated with the rack frame to establish air-flow through the rack frame physically simulating operational airflow through the multiple electronic subsystems of the electronics rack, and multiple airflow impedance filters associated with the rack frame configured to simulate airflow impedance from the air inlet side of the rack frame to the air outlet side thereof corresponding to operational airflow impedance through the multiple electronic subsystems of the electronics rack from an air inlet side to an air outlet side thereof.

11. A method of providing an apparatus to physically simulate at least one operational characteristic of an electronics rack comprising at least one electronic subsystem, the method comprising:
  obtaining a rack frame sized to the electronics rack to be simulated, the rack frame being distinct from the electronics rack for which at least one operational characteristic is to be physically simulated, and the rack frame lacking the at least one electronic subsystem of the electronics rack;
  the rack frame comprising at least one of an air inlet door or an air outlet door, the air inlet door being hingedly mounted along one edge to the rack frame at an air inlet side of the rack frame and comprising an opening therein allowing external air into the rack frame, and the air outlet door being hingedly mounted along one edge to the rack frame at the air outlet side of the rack frame and comprising an opening therein allowing air from the rack frame to pass therethrough;
  associating at least one air-moving device with the rack frame to establish a physical airflow through the rack frame from an air inlet side to an air outlet side thereof, wherein established physical airflow through the rack frame correlates to anticipated operational airflow through the electronics rack; and
  providing an adjustable heat source associated with the rack frame, the adjustable heat source comprising an adjustable fluid heater providing a heated fluid of a controlled temperature and at least one heated fluid-to-air heat exchanger coupled to receive the heated fluid, the adjustable heat source controllably heating air passing through the rack frame, wherein the at least one heated fluid-to-air heat exchanger is mounted within at least one of the at least one air inlet door or air outlet door, and heats air passing across the at least one heated fluid-to-air heat exchanger by transferring heat from the heated fluid passing therethrough to the air passing thereacross, with heated air physically exhausting from the air outlet side of the rack frame being controlled to physically simulate heated air to exhaust from the electronics rack during operation thereof.

12. The method of claim 11, further comprising positioning at least one airflow impedance filter within the rack frame configured to simulate airflow impedance from the air inlet side of the rack frame to the air outlet side thereof correlated to anticipated airflow impedance from an air inlet side of the electronics rack to an air outlet side thereof during operation of the electronics rack.

13. The method of claim 11, wherein providing the adjustable heat source comprises:
  providing heated fluid piping to the at least one heated fluid-to-air heat exchanger supplying the heated fluid to the at least one fluid-to-air heat exchanger to heat air passing through the rack frame and exhausting from the air outlet side thereof, and thereby physically simulate anticipated heated airflow to exhaust from the electronics rack during operation thereof.

14. The method of claim 13, further comprising providing a controller coupled to the rack frame to monitor at least one of rotations of the at least one air-moving device, temperature of the heated fluid supplied to the at least one heated fluid-to-air heat exchanger, or heated fluid flow rate to the heated fluid-to-air heat exchanger.

15. The method of claim 14, wherein the controller facilitates dynamically adjusting rotations of the at least one air-moving device, temperature of the heated fluid supplied to the at least one heated fluid-to-air heat exchanger, and flow rate of the heated fluid supplied to the at least one heated fluid-to-air heat exchanger.

16. The method of claim 13, wherein the adjustable fluid heater comprises an electrical fluid heater, and an adjustable power supply coupled thereto, wherein adjustment of the adjustable power supply controls the temperature of the heated fluid supplied to the at least one heated fluid-to-air heat exchanger.

17. The method of claim 11, wherein the electronics rack comprises at least one computer blade center system, and wherein the method further comprises disposing at least one blade center chassis within the rack frame, each blade center chassis being configured to receive a plurality of electronic blades of a computer blade center system, and wherein the method further comprises disposing a plurality of dummy-blade airflow impedance filters within each blade center chassis in the rack frame to physically simulate operational airflow impedance through a respective computer blade center system of the at least one computer blade center system of the electronics rack, the plurality of dummy-blade airflow impedance filters being distinct from the plurality of electronic blades of the computer blade center system.

18. The method of claim 11, wherein the rack frame further comprises both the air inlet door and the air outlet door, and wherein the providing the adjustable heat source comprises providing a first heated fluid-to-air heat exchanger mounted within the air inlet door hingedly mounted to the rack frame at the air inlet side thereof, and a second heated fluid-to-air heat exchanger mounted within the air outlet door hingedly mounted to the rack frame at the air outlet side thereof, and wherein the first heated fluid-to-air heat exchanger and the second heated fluid-to-air heat exchanger are coupled via piping in-series fluid communication for transfer of the heated fluid through the first heated fluid-to-air heat exchanger and the second heated fluid-to-air heat exchanger for heating of air passing through the rack frame.

* * * * *